(12) United States Patent
Hu

(10) Patent No.: US 12,111,703 B2
(45) Date of Patent: Oct. 8, 2024

(54) DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Yang Hu, Wuhan (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 267 days.

(21) Appl. No.: 17/598,288

(22) PCT Filed: Jun. 24, 2021

(86) PCT No.: PCT/CN2021/102027
§ 371 (c)(1),
(2) Date: Sep. 26, 2021

(87) PCT Pub. No.: WO2022/252308
PCT Pub. Date: Dec. 8, 2022

(65) Prior Publication Data
US 2023/0305603 A1 Sep. 28, 2023

(30) Foreign Application Priority Data

Jun. 4, 2021 (CN) .................. 202110626236.6

(51) Int. Cl.
G06F 1/16 (2006.01)

(52) U.S. Cl.
CPC .......... *G06F 1/1686* (2013.01); *G06F 1/1652* (2013.01)

(58) Field of Classification Search
CPC .............................. G06F 1/1652; G06F 1/1686
See application file for complete search history.

(56) References Cited

U.S. PATENT DOCUMENTS 10,194,543 B2 * 1/2019 Seo .................. G06F 1/1626
10,754,386 B2 * 8/2020 Lee .................. G06F 1/1624
(Continued)

FOREIGN PATENT DOCUMENTS

CN 108377279 A 8/2018
CN 108881528 A 11/2018
(Continued)

OTHER PUBLICATIONS

Chinese Office Action in corresponding Chinese Patent Application No. 202110626236.6 dated Jan. 6, 2022, pp. 1-6.
(Continued)

*Primary Examiner* — Sagar Shrestha
(74) *Attorney, Agent, or Firm* — PV IP PC; Wei Te Chung

(57) ABSTRACT

The present application relates to a display device that connects two side edges of a flexible display screen to two pivot shafts respectively. When a camera device is turned on, a camera hole and a lens are disposed oppositely. When the camera device is turned off, a portion of a flexible display screen defined with a camera hole is wound around one of the pivot shafts, under a non-photography state of the camera device, the camera hole hidden in a frame body, and the exposed flexible display screen presents a full screen display effect to improve user experience.

8 Claims, 6 Drawing Sheets

(56) References Cited

U.S. PATENT DOCUMENTS

| | | | |
|---|---|---|---|
| 10,880,417 B1 | 12/2020 | Song | |
| 10,881,009 B2* | 12/2020 | Jiang | H05K 5/0017 |
| 11,079,797 B1* | 8/2021 | Remez | H04M 1/0268 |
| 2008/0144265 A1* | 6/2008 | Aoki | G06F 1/1601 |
| | | | 361/679.04 |
| 2012/0212433 A1* | 8/2012 | Lee | G06F 1/1643 |
| | | | 345/173 |
| 2013/0128439 A1* | 5/2013 | Walters | G06F 1/1624 |
| | | | 361/679.04 |
| 2014/0194165 A1* | 7/2014 | Hwang | G06F 3/147 |
| | | | 455/566 |
| 2016/0100478 A1* | 4/2016 | Lee | G06F 1/1624 |
| | | | 361/749 |
| 2018/0011516 A1* | 1/2018 | Seo | G09F 9/301 |
| 2018/0014417 A1* | 1/2018 | Seo | H05K 7/20954 |
| 2018/0103550 A1* | 4/2018 | Seo | G06F 1/1601 |
| 2019/0317550 A1* | 10/2019 | Kim | G06F 1/1694 |
| 2019/0373151 A1* | 12/2019 | Jia | H04M 1/0264 |
| 2020/0192434 A1* | 6/2020 | Huang | G06F 1/1681 |
| 2020/0335017 A1* | 10/2020 | Yao | H10K 50/844 |
| 2021/0076517 A1* | 3/2021 | Wang | H05K 5/0217 |
| 2022/0046153 A1* | 2/2022 | Kim | G06F 1/1637 |
| 2022/0053653 A1* | 2/2022 | Jung | G01D 5/12 |
| 2022/0091636 A1* | 3/2022 | Cho | H02K 7/116 |
| 2022/0139282 A1* | 5/2022 | Kim | G06F 1/1686 |
| | | | 345/55 |
| 2022/0317736 A1* | 10/2022 | Li | G06F 1/1624 |
| 2022/0418126 A1* | 12/2022 | Lee | G06F 1/1652 |
| 2023/0087798 A1* | 3/2023 | Chu | G06F 1/1652 |
| | | | 361/679.01 |

FOREIGN PATENT DOCUMENTS

| | | |
|---|---|---|
| CN | 108924296 A | 11/2018 |
| CN | 110881068 A | 3/2020 |
| CN | 210839661 U | 6/2020 |
| CN | 111524459 A | 8/2020 |
| CN | 112532770 A | 3/2021 |
| CN | 112839118 A | 5/2021 |
| KR | 20190129297 A | 11/2019 |
| WO | 2019154325 A1 | 8/2019 |
| WO | 2021104314 A1 | 6/2021 |

OTHER PUBLICATIONS

International Search Report in International application No. PCT/CN2021/102027, mailed on Mar. 1, 2022.
Written Opinion of the International Searching Authority in International application No. PCT/CN2021/102027, mailed on Mar. 1, 2022.
Japanese Office Action issued in corresponding Japanese Patent Application No. 2021-564402 dated Aug. 22, 2023, pp. 1-4.
Eurasian Office Action issued in corresponding Eurasian Patent Application No. 202291996 dated Oct. 27, 2023, pp. 1-2.
Eurasian Office Action issued in corresponding Eurasian Patent Application No. 202291996 dated May 21, 2024, pp. 1-3.

* cited by examiner

DISPLAY DEVICE

RELATED APPLICATIONS

This application is a Notional Phase of PCT Patent Application No. PCT/CN2021/102027 having international filing date of Jun. 24, 2021, which claims the benefit of priority of Chinese Patent Application No. 202110626236.6 filed on Jun. 4, 2021. The contents of the above applications are all incorporated by reference as if fully set forth herein in their entirety.

FIELD OF INVENTION

The present application relates to a field of display technologies, especially to a display device.

BACKGROUND OF INVENTION

Display devices can transform computer data into various characters, numbers, symbols or intuitive images for display, and can use keyboards and other input tools to input commands or data into the computer, and use hardware software of a system to add, delete, modify, and change display contents at any time. display device. The display devices are divided into types of plasma, liquid crystal, light emitting diode, and cathode ray tube according to the display device used.

Organic light emitting diode (OLED) display devices are also called organic electroluminescence display devices or organic light emitting diode semiconductors. An OLED has the advantages of low voltage demand, high power saving efficiency, fast responses, light in weight, thin thickness, simple structure, low cost, wide viewing angles, almost infinitely high contrast, low power consumption, and extremely high response speed, and has become one of the most important display technologies today.

SUMMARY OF INVENTION

Technical Issue

With continuous development of display equipment, under-screen camera devices have gradually become a development trend. Under-screen camera device presented in the market mainly rely on a lens region of a camera device employing original film material and inorganic film material with higher transparency and optimize a metal layer structure in a flexible display screen to improve transparency of the flexible display screen. Through a special pixel arrangement, the transition between the camera hole and the periphery is more natural, but there is still the risk of inconsistency in color difference and resolution. Therefore, a new type of display device is needed to solve the above problems.

Technical Solution

An objective of the present application is to provide a display device able to solve the issue that a front camera in the conventional display device affects a display region range, and a camera hole of the under-screen camera has a worse display effect.

To solve the above issue, the present application provides a display device comprising: a frame body; two pivot shafts rotatably installed in the frame body, wherein central axes of the two pivot shafts are parallel to each other; a flexible display screen, wherein two side edges of the flexible display screen are connected to the two pivot shafts respectively, a camera hole is defined in the flexible display screen, and the camera hole is located near one side edge of the flexible display screen; and a camera device fixed in the frame body, wherein the camera device comprises a lens, and the lens faces the flexible display screen; wherein when the camera device is turned on, the camera hole and the lens are disposed oppositely; wherein when the camera device is turned off, a portion of the flexible display screen in which the camera hole is defined is wound around one of the pivot shafts.

Furthermore, a distance between the central axes of the two pivot shafts is constant.

Furthermore, when the camera device is turned on, the two pivot shafts simultaneously rotate along a first direction and the camera hole and the lens are disposed oppositely; when the camera device is turned off, the two pivot shafts simultaneously rotate along a second direction, and the portion of the flexible display screen in which the camera hole is defined is wound around the one of the pivot shafts.

Furthermore, the two side edges of the flexible display screen are connected to two pivot shafts respectively in glue connection or snap-fit connection.

Furthermore, the frame body comprises: two sub-frame bodies disposed oppositely and detachably connected to each other; one of the pivot shafts is disposed in each of the sub-frame bodies; and a telescopic mechanism, wherein two ends of telescopic mechanism are connected to the two sub-frame bodies respectively.

Furthermore, the camera device is fixed on one of the sub-frame bodies.

Furthermore, a distance between the central axes of the two pivot shafts when the telescopic mechanism is retracted is less than the distance between the central axes of the two pivot shafts when the telescopic mechanism is stretched.

Furthermore, when the telescopic mechanism is in a stationary state, the camera device is turned on, the two pivot shafts simultaneously rotate along a first direction, the camera hole and the lens are disposed oppositely; and when the telescopic mechanism is in the stationary state, the camera device is turned off, the two pivot shafts simultaneously rotate along a second direction, and the portion of the flexible display screen in which the camera hole is defined is wound around one of the pivot shafts.

Furthermore, when the telescopic mechanism is retracted, the camera device is turned off, one of the pivot shafts rotates along a second direction, the other of the pivot shafts rotates around a first direction, the portion of the flexible display screen in which the camera hole is defined is wound around one of the pivot shafts; or, one of the pivot shafts rotates along the second direction, the other of the pivot shafts does not rotate, and the portion of the flexible display screen in which the camera hole is defined is wound around one of the pivot shafts; and when the telescopic mechanism is stretched, the camera device is turned on, one of the pivot shafts rotates along the first direction, the other of the pivot shafts rotates along the second direction, the camera hole and the lens are disposed oppositely; or one of the pivot shafts rotates along the first direction, the other of the pivot shafts does not rotate, and the camera hole and the lens are disposed oppositely.

Furthermore, the telescopic mechanism comprises: an inner tube, wherein one end of the inner tube is fixed on the one of the sub-frame bodies; and an outer tube, wherein one end of the outer tube is fixed on one of the sub-frame bodies, and another end of the outer tube is slidably disposed around an outer wall of the inner tube.

Advantages

The present application relates to a display device, the present application connects two side edges of a flexible display screen to two pivot shafts. When the camera device is turned on, the camera hole and the lens are disposed oppositely to facilitating the camera device acquiring images. When the camera device is turned off, a portion of the flexible display screen defined with the camera hole is wound around one of the pivot shafts. When the camera device is in a non-photography state, the camera hole is hidden in the frame body such that the exposed flexible display screen presents a full screen display effect, which improves a user's experience.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

FIG. 1 is a schematic structural view of a display device of a first embodiment of the present application with a camera device turned on.

FIG. 3 is a schematic plan view of the display device of the first embodiment of the present application with a camera device turned on.

Figure 1:
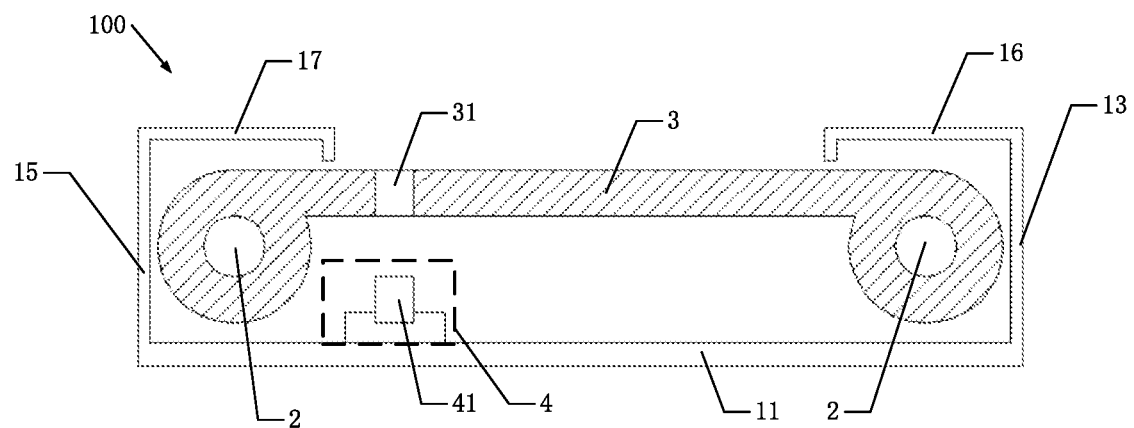

INDICATION OF REFERENCE CHARACTERS 100, display device
1, frame body 2, pivot shafts
3, flexible display screen 4, camera device
5, motor
11, bottom plate 12, first side plate
13, second side plate 14, third side plate
15, fourth side plate 16, first cover plate
17, second cover plate
31, camera hole 41, lens
101, sub-frame bodies 102, telescopic mechanism
1021, inner tube 1022, outer tube.

DETAILED DESCRIPTION OF PREFERRED EMBODIMENTS

Preferred embodiments of the present invention are described with accompanying drawings as follows introduce a person of ordinary skill in the art the technical contents of the present invention completely such that examples are used to prove that the present invention can be embodied. As such the published technologies of the present invention are made clearer such that a person of ordinary skill in the art can better understand the way to embody the present invention. However, the present invention can be embodied by embodiments of various forms, and the protective scope of the present invention is not only limited in the mentioned embodiment herein, and explanation of the following embodiments is not for limiting the scope of the present invention.

The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention.

In the drawings, elements with the same structures are indicated with the same numerals, and elements with similar structures or functions are indicated with similar numerals. Furthermore, for convenience of understanding and description, the dimension and thickness of each assembly in the drawings are depicted at arbitrarily, and the present invention has no limit to the dimension and thickness of each assembly.

First Embodiment

With reference to FIG. 1, the present embodiment provides a display device 100 comprising a frame body 1, a two pivot shafts 2, a flexible display screen 3, and a camera device 4.

Figure 2:
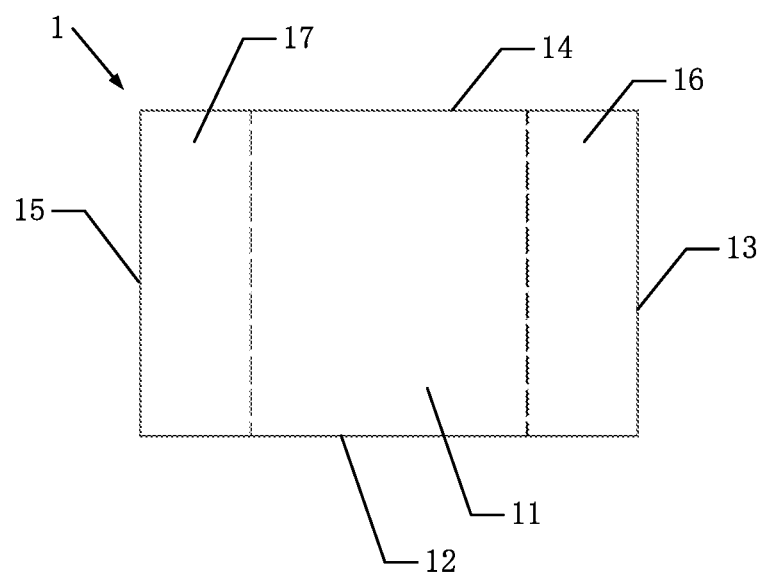
FIG. 2 is a schematic structural view of a frame body of the first embodiment of the present application.

With reference to FIGS. 1 and 2, the frame body 1 of the present embodiment comprises a bottom plate 11, a first side plate 12, a second side plate 13, a third side plate 14, a fourth side plate 15, a first cover plate 16, and second cover plate 17.

The first side plate 12, the second side plate 13, the third side plate 14, the fourth side plate 15 are sequentially connected to one another, and are perpendicularly connected to a periphery of the bottom plate 11. The first cover plate 16 is connected to the first side plate 12 and second side plate 13, and third side plate 14. The second cover plate 17 is connected to the third side plate 14, fourth side plate 15 and first side plate 12. In the present embodiment, both the first cover plate 16 and the second cover plate 17 are parallel to the bottom plate 11. A gap is defined between the first cover plate 16 and the second cover plate 17 such that a user can easily view display images of the flexible display screen 3.

With reference to FIGS. 1 and 2, the two pivot shafts 2 are rotatably installed in the frame body 1, and central axes of the two pivot shafts 2 are parallel to each other. Specifically, in the present embodiment, the pivot shafts 2 are rotatably installed on inner sidewalls of the first side plate 12 and the third side plate 14.

With reference to FIG. 1, two side edges of the flexible display screen 3 are connected to the two pivot shafts 2 respectively. Namely, a side edge of the flexible display screen 3 parallel to the central axes of the pivot shafts 2 is connected to one of the pivot shafts 2, and another side edge of the flexible display screen 3 parallel to the central axes of the pivot shafts 2 is connected to the other of the pivot shafts 2. In the present embodiment, the two side edges of the flexible display screen 3 parallel to the central axes of the pivot shafts 2 is connected to the two pivot shafts 2 in glue connection. In other embodiment, the two side edges of the flexible display screen 3 parallel to the central axes of the pivot shafts 2 can also be connected to the two pivot shafts 2 snap-fit connection.

Figure 3:
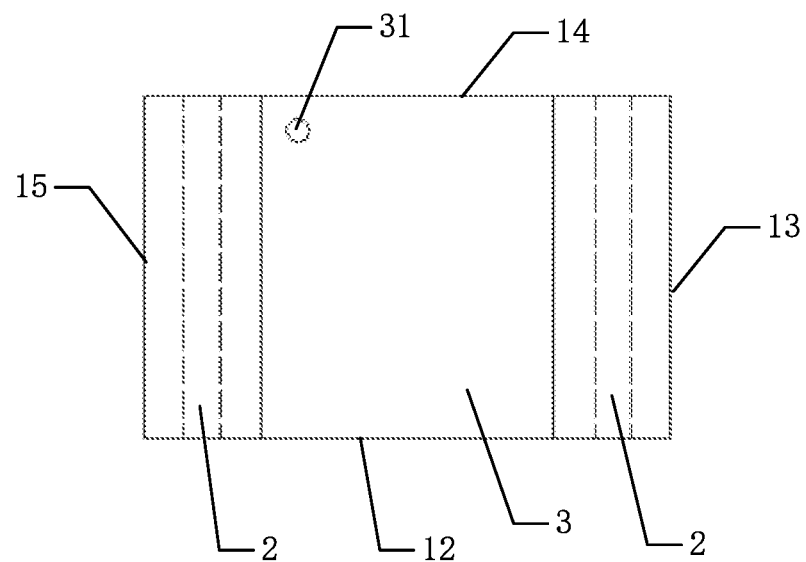

With reference to FIGS. 1 and 3, a camera hole 31 is defined in the flexible display screen 3, the camera hole 31 is located near one side edge of the flexible display screen 3 parallel to the central axes of the pivot shafts 2. In the present embodiment, the camera hole 31 is defined in a left upper corner of the flexible display screen 3. In other embodiment, camera hole 31 can also be defined in a location such as a left end middle portion, a left lower corner, a right-upper corner, or a right end middle portion of the flexible display screen 3.

With reference to FIG. 1, camera device 4 is fixed in the frame body 1. The camera device 4 comprises lens 41, and the lens 41 faces the flexible display screen 3. The camera device 4 can be an image acquisition device such as a camera.

Figure 4:
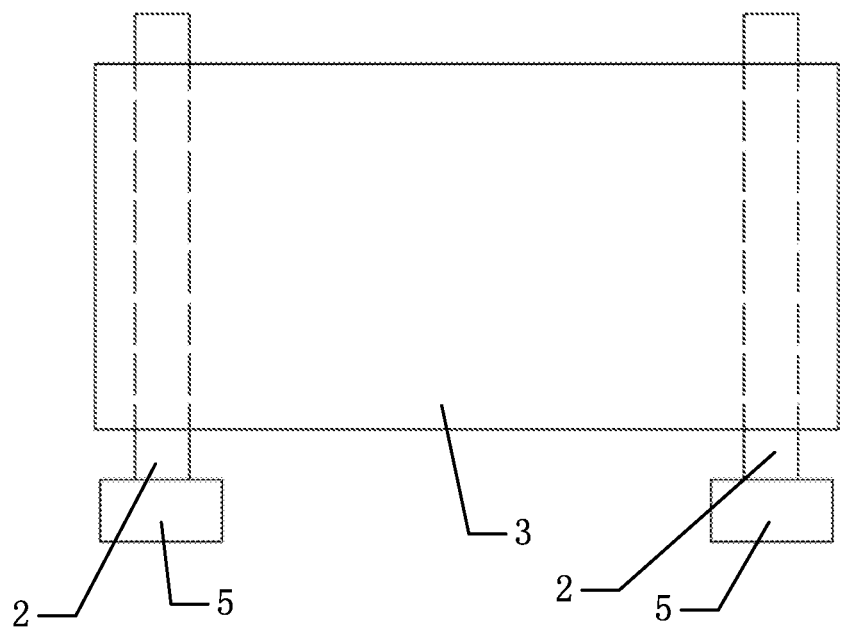
FIG. 4 is a schematic connection view of pivot shafts and motors of the first embodiment of the present application.
Figure 5:
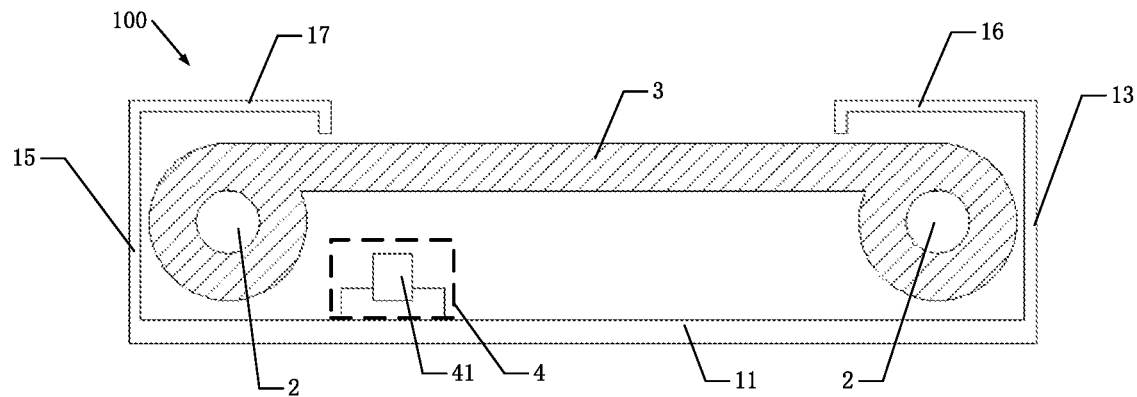
FIG. 5 is a schematic structural view of the display device of the first embodiment of the present application with the camera device turned off.
Figure 6:
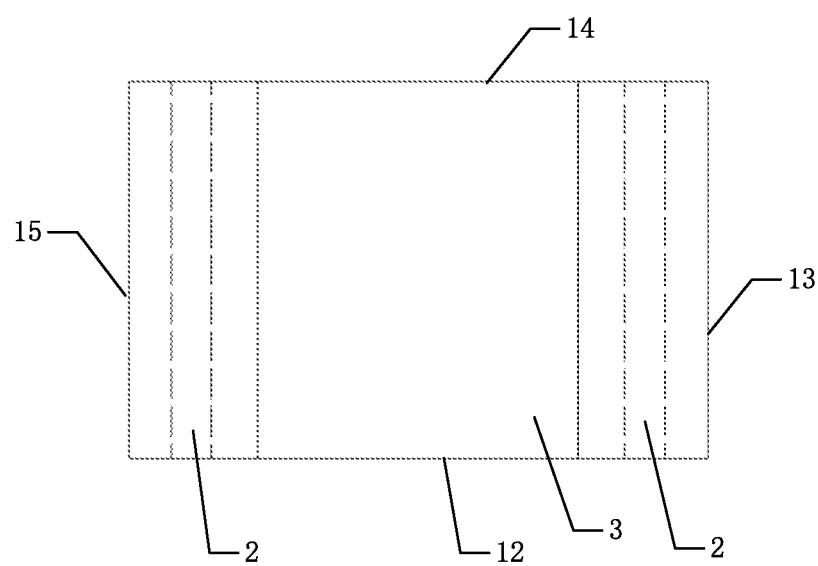
FIG. 6 is a schematic plan view of the display device of the first embodiment of the present application with the camera device turned off.

With reference to FIG. 4, the display device 100 further comprises a motor 5. The motor 5 is disposed in the frame body 1. The motor 5 comprises a rotor, the rotor is connected to the pivot shafts 2 through a transmission device. In the present embodiment, display device 100 comprises two motors 5, one motor 5 is connected to one pivot shaft 2, the other motor 5 is connected to the other pivot shaft 2. The motor 5 is mainly configured to drive the pivot shaft 2 to rotate.

With reference to FIGS. 1 to 6, when the camera device 4 is turned on, the camera hole 31 and the lens 41 are disposed oppositely to facilitating the camera device 4 acquiring images. When the camera device 4 is turned off, a portion of the flexible display screen 3 defined with the camera hole 31 is wound around one of the pivot shafts 2. When the camera device 4 is in a non-photography state, the camera hole 31 is hidden in the frame body 1 such that the exposed flexible display screen 3 presents a full screen display effect, which can prevent color difference and inconsistent resolutions between the camera hole 31 and the periphery and improve a user's experience.

In the present embodiment, a distance between the central axes of the two pivot shafts keeps constant, and the two pivot shafts 2 rotate along the direction. When the camera device 4 is turned on, the two pivot shafts 2 simultaneously along first direction, the camera hole 31 and the lens 41 are disposed oppositely. When the camera device 4 is turned off, the two pivot shafts 2 simultaneously along a second direction, and the portion of the flexible display screen 3 defined with the camera hole 31 is wound around one of the pivot shafts 2. Specifically, in the present embodiment, when a user needs to turn on the camera device 4, the motor 5 on a left side drives the pivot shaft 2 on the left side to rotate clockwise, and the motor 5 on a right side drives the pivot shaft 2 on the right side to rotate clockwise. A portion of the flexible display screen 3 at a right end is driven by the pivot shaft 2 on the right side to be wound around the pivot shaft 2 on the right side to make the camera hole 31 exposed out of the frame body 1. The camera hole 31 and the lens 41 are disposed oppositely to achieve a work of image acquisition of the camera device 4. When the user needs to turn off the camera device 4, the motor 5 on the left side drives the pivot shafts 2 on the left side counterclockwise, the motor 5 on a right side drives the pivot shaft 2 on the right side to rotate counterclockwise. A portion of the flexible display screen 3 at a left end is driven by the pivot shafts 2 on the left side to be wound around the pivot shafts 2 on the left side to make the camera hole 31 hidden in the frame body 1 such that the exposed flexible display screen 3 presents a full screen display effect, which can prevent color difference and inconsistent resolutions between the camera hole 31 and the periphery and improve a user's experience. Namely, in the present embodiment, the first direction is a clockwise direction, and the second direction is a counterclockwise direction. In other embodiment, the first direction can also be a counterclockwise direction, and the second direction is a clockwise direction.

Second Embodiment

Figure 7:
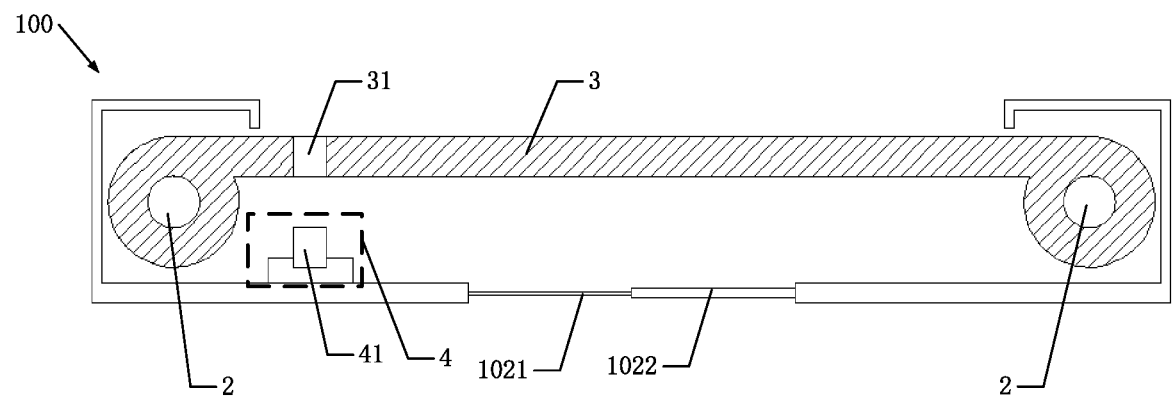
FIG. 7 is a schematic structural view of the display device of a second embodiment of the present application with the camera device turned on in a stretching state of a telescopic mechanism.

With reference to FIG. 7, the present embodiment provides a display device 100 comprising: a frame body 1, two pivot shafts 2, a flexible display screen 3, and a camera device 4.

Figure 8:
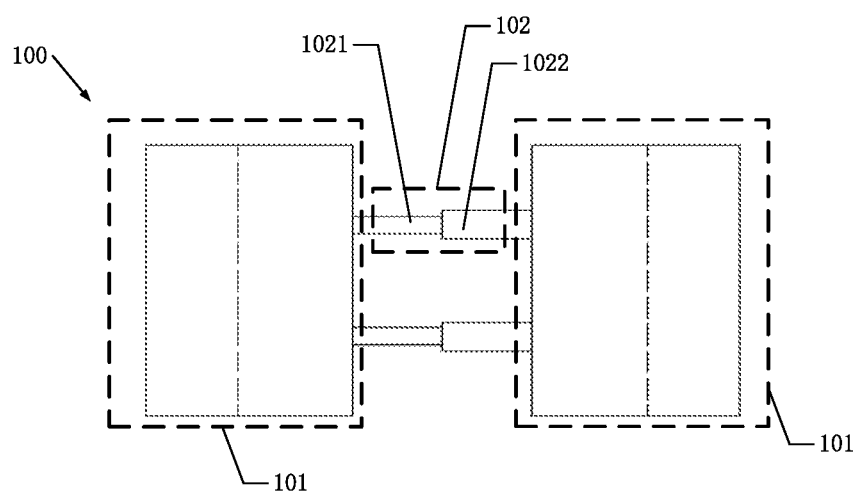
FIG. 8 is a schematic structural view of a frame body of the second embodiment of the present application in the stretching state of the telescopic mechanism.

With reference to FIGS. 7 and 8, the frame body 1 of the present embodiment comprises two sub-frame bodies 101 and telescopic mechanism 102 disposed oppositely. The two sub-frame bodies 101 are detachably connected to each other. Two ends of the telescopic mechanism 102 are connected to the two sub-frame bodies 101 respectively to adjust a distance between the two sub-frame bodies 101 distance. In the present embodiment, the frame body 1 comprises two telescopic mechanism 102, In other embodiment, frame body 1 can only comprise one telescopic mechanism 102 or two or more telescopic mechanisms 102.

With reference to FIG. 8, the telescopic mechanism 102 of the present embodiment comprises: an inner tube 1021 and an outer tube 1022. A right end of the outer tube 1022 is fixed on a right one of the sub-frame bodies 101, and a left end of the outer tube 1022 is slidably disposed around an outer wall of the inner tube 1021. A left end of the inner tube 1021 is fixed on a left one of the sub-frame bodies 101. Specifically, retraction and stretch of the telescopic mechanism 102 can be achieve in an electric, pneumatic or hydraulic manner. The present embodiment only demonstrates one structure of the telescopic mechanism 102. In other embodiment, the telescopic mechanism 102 in other form can also be used, and the present application has no limit to the structure of the telescopic mechanism 102.

With reference to FIG. 7, one of the pivot shafts 2 is disposed in each of the sub-frame bodies 101. Namely, the two pivot shafts 2 can be rotatably installed in the sub-frame bodies 101 respectively, and central axes of the two pivot shafts 2 are parallel to each other.

With reference to FIG. 7, the two side edges of the flexible display screen 3 are connected to the two pivot shafts 2 respectively. Namely, one side edge of the flexible display screen 3 parallel to the central axes of the pivot shafts 2 is connected to one pivot shaft 2, and the other side edge of the flexible display screen 3 parallel to the central axes of the pivot shafts 2 is connected to the other pivot shaft 2. In the present embodiment, the two side edges of the flexible display screen 3 parallel to the central axes of the pivot shafts 2 are connected to the two pivot shafts 2 in glue connection. In other embodiment, the two side edges of the flexible display screen 3 parallel to the central axes of the pivot shafts 2 can also be connected to the two pivot shafts 2 in snap-fit connection.

Figure 9:
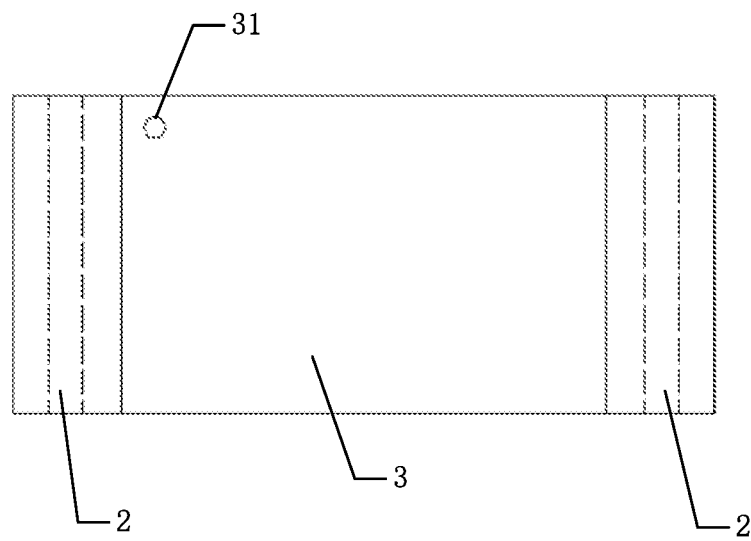
FIG. 9 is a schematic plan view of the display device of the second embodiment of the present application with the camera device turned on in the stretching state of the telescopic mechanism.

With reference to FIGS. 7 and 9, a camera hole 31 is defined in the flexible display screen 3, the camera hole 31 is located near one side edge of the flexible display screen 3 parallel to the central axes of the pivot shafts 2. In the present embodiment, the camera hole 31 is defined in a left upper corner of the flexible display screen 3. In other embodiment, camera hole 31 can also be defined in a location such as a left end middle portion, a left lower corner, a right-upper corner, or a right end middle portion of the flexible display screen 3.

With reference to FIG. 7, the camera device 4 is fixed in the frame body 1. The camera device 4 comprises a lens 41, and the lens 41 faces the flexible display screen 3. The camera device 4 can be an image acquisition device such as a camera. In the present embodiment, the camera device 4 is fixed on one of the sub-frame bodies 101.

With reference to FIG. 4, the display device 100 further comprises a motor 5. The motor 5 is disposed in the frame body 1. The motor 5 comprises a rotor, the rotor is connected to the pivot shafts 2 through a transmission device. Similar to the first embodiment, in the present embodiment, the display device 100 comprises two motor 5, one motor 5 is connected to one pivot shaft 2, the other motor 5 is connected to the other pivot shaft 2. The motor 5 is mainly configured to drive the pivot shaft 2 to rotate.

Figure 10:
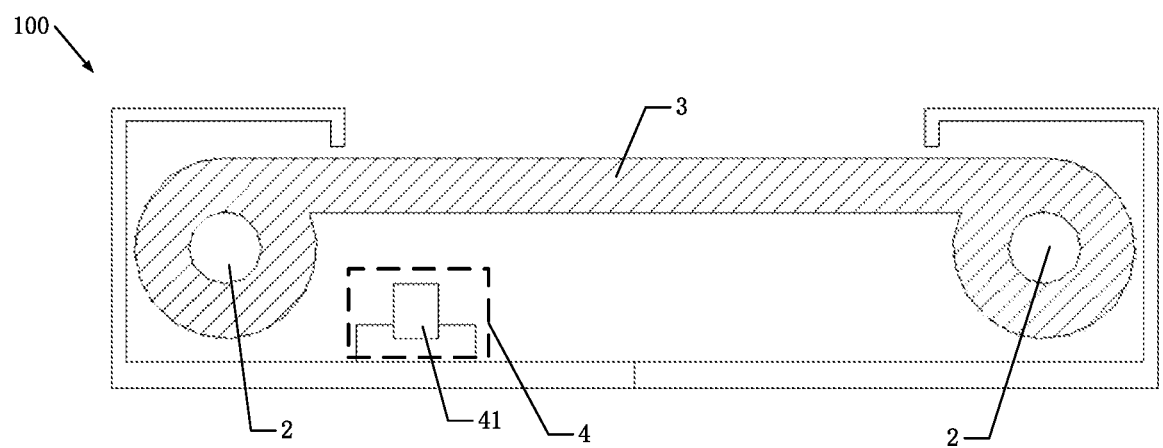
FIG. 10 is a schematic structural view of the display device of the second embodiment of the present application with the camera device turned off in a retracting state of the telescopic mechanism.
Figure 11:
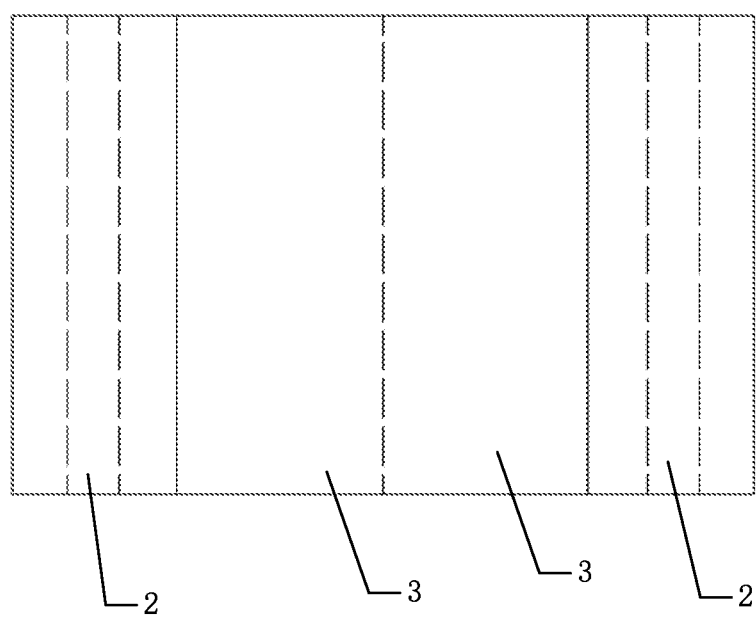
FIG. 11 is a schematic plan view of the display device of the second embodiment of the present application with the camera device turned off in the retracting state of the telescopic mechanism.

With reference to FIGS. 7 and 10, In the present embodiment, the distance between the central axes of the two pivot shafts 2 when the telescopic mechanism 102 retracts is less than the distance between the central axes of the two pivot shafts 2 when the telescopic mechanism 102 stretches. As such, when the telescopic mechanism 102 stretches, an exposed area of the flexible display screen 3 can be increased. In the meantime the display area is greater, which can fulfill the user's requirement for large screen display.

With reference to FIGS. 7 to 10, when the telescopic mechanism 102 is in a stationary state, the camera device 4 is turned on, the two pivot shafts 2 simultaneously rotates along the first direction, the camera hole 31 and the lens 41 are disposed oppositely. The camera device 4 is turned off, the two pivot shafts 2 simultaneously rotate along the second direction. A portion of the flexible display screen 3 defined with the camera hole 31 is wound around one of the pivot shafts 2. In the present embodiment, the first direction is a clockwise direction, and the second direction is a counterclockwise direction. In other embodiment, the first direction can also be a counterclockwise direction, and the second direction is a clockwise direction.

With reference to FIGS. 7 to 10, when the telescopic mechanism 102 retracts, the camera device 4 is turned off, one of the pivot shafts 2 rotates along the second direction, and the other of the pivot shafts 2 rotates along the first direction. The portion of the flexible display screen 3 defined with the camera hole 31 is wound around one of the pivot shafts 2. Specifically, In the present embodiment, when the telescopic mechanism 102 retracts, the camera device 4 is turned off, the motor 5 on a left side drives the pivot shaft 2 on the left side to rotate counterclockwise, the motor 5 on a right side drives the pivot shaft 2 on the right side to rotate clockwise, a portion of the flexible display screen 3 at a left end is driven by the pivot shaft 2 on the left side to be wound around the pivot shaft 2 on the left side, the portion of the flexible display screen 3 at a right end is driven by the pivot shaft 2 on the right side to be wound around the pivot shaft 2 on the right side to make the camera hole 31 hidden in the frame body 1 such that the exposed flexible display screen 3 presents a full screen display effect, which can prevent color difference and inconsistent resolutions between the camera hole 31 and the periphery and improve a user's experience.

In other embodiment, when the telescopic mechanism 102 retracts, the camera device 4 is turned off, one of the pivot shafts 2 rotates along the second direction, the other of the pivot shafts keep unrotated, and the portion of the flexible display screen 3 defined with the camera hole 31 is wound around one of the pivot shafts 2. Specifically, In other embodiment, when the telescopic mechanism 102 retracts, the camera device 4 is turned off, the motor 5 on the left side drives the pivot shafts 2 on the left side counterclockwise, the pivot shaft 2 on the right side keeps stationary, a portion of the flexible display screen 3 at a left end is driven by the pivot shafts 2 on the left side to be wound around the pivot shafts 2 on the left side to make the camera hole 31 hidden in the frame body 1 such that the exposed flexible display screen 3 presents a full screen display effect, which can prevent color difference and inconsistent resolutions between the camera hole 31 and the periphery and improve a user's experience.

With reference to FIGS. 7 to 10, when the telescopic mechanism 102 stretches, the camera device 4 is turned on, one pivot shaft 2 rotates along the first direction, the other pivot shaft 2 rotates along the second direction, and the camera hole 31 and the lens 41 are disposed oppositely. Specifically, In the present embodiment, when the telescopic mechanism 102 stretches, the camera device 4 is turned on, the motor 5 on the left side drives the pivot shafts 2 on the left side to rotate clockwise, and the motor 5 on a right side drives the pivot shaft 2 on the right side to rotate counterclockwise to make the camera hole 31 and the lens 41 disposed oppositely such that the camera device 4 easily acquires images and an exposed area of the flexible display screen 3 can be increased.

In other embodiment, when the telescopic mechanism 102 stretches, the camera device 4 is turned on, one pivot shaft 2 rotates along the first direction, the other pivot shaft 2 keeps unrotated, and the camera hole 31 and the lens 41 are disposed oppositely. Specifically, in other embodiment, when the telescopic mechanism 102 stretches, the camera device 4 is turned on, the motor 5 on the left side drives the pivot shafts 2 on the left side rotates clockwise, the pivot shaft 2 on the right side keep stationary to make the camera hole 31 and the lens 41 disposed oppositely such that camera device 4 easily acquires images and an exposed area of the flexible display screen 3 cab be increased.

In the present embodiment, FIGS. 7 and 9 only illustrate a schematic structural view and a schematic plan view of the display device with the camera device 4 turned on in a stretching state of the telescopic mechanism 102. In fact, in the stretching state of the telescopic mechanism 102, the camera device 4 can also turned off, in other words, the camera hole 31 is not exposed, only an exposed area of the flexible display screen 3 is increased. In the meantime, the display region area is greater, which can fulfill the user's requirement for large screen display.

With reference to FIGS. 7 to 11, when the camera device 4 is turned on, the camera hole 31 and the lens 41 are disposed oppositely to facilitating the camera device 4 acquiring images. When the camera device 4 is turned off, a portion of the flexible display screen 3 defined with the camera hole 31 is wound around one of the pivot shafts 2. When the camera device 4 is in a non-photography state, the camera hole 31 is hidden in the frame body 1 such that the exposed display screen 3 presents a full screen display effect, which can prevent color difference and inconsistent resolutions between the camera hole 31 and the periphery and improve a user's experience.

The display device provided by the present application are described in detail as above. In the specification, the specific examples are used to explain the principle and embodiment of the present application. The above description of the embodiments is only used to help understand the method of the present application and its spiritual idea. Meanwhile, for those skilled in the art, according to the present the idea of invention, changes will be made in specific embodiment and application. In summary, the contents of this specification should not be construed as limiting the present application.

What is claimed is:

1. A display device, comprising:
   a frame body;
   two pivot shafts rotatably installed in the frame body, wherein central axes of the two pivot shafts are parallel to each other;
   a flexible display screen, wherein two side edges of the flexible display screen are connected to the two pivot shafts respectively, a camera hole is defined in the flexible display screen, and the camera hole is located near one side edge of the flexible display screen; and
   a camera device fixed in the frame body, wherein the camera device comprises a lens, and the lens faces the flexible display screen;
   wherein when the camera device is turned on, the camera hole and the lens are aligned with each other;
   wherein when the camera device is turned off, a portion of the flexible display screen in which the camera hole is defined is wound around one of the pivot shafts such that the camera hole is misaligned with the camera device;
   wherein two motors are connected to the two pivot shafts respectively and are configured to drive the pivot shafts to synchronously rotate to align or misalign the camera hole in the flexible display screen with the camera device;
   wherein the frame body comprises:
      two sub-frame bodies disposed oppositely and detachably connected to each other; one of the pivot shafts is disposed in each of the sub-frame bodies; and
      at least two telescopic mechanisms retractably connected and evenly distributed between the sub-frame bodies and spaced from each other, wherein two ends of each of the telescopic mechanisms are connected to the two sub-frame bodies respectively;
   wherein each of the telescopic mechanism comprises:
      an inner tube, wherein one end of the inner tube is fixed on the one of the sub-frame bodies; and
      an outer tube, wherein one end of the outer tube is fixed on one of the sub-frame bodies, and another end of the outer tube is slidably disposed around an outer wall of the inner tube.

2. The display device according to claim 1, wherein a distance between the central axes of the two pivot shafts is constant.

3. The display device according to claim 2, wherein
   when the camera device is turned on, the two pivot shafts simultaneously rotate along a first direction and the camera hole and the lens are disposed oppositely;
   when the camera device is turned off, the two pivot shafts simultaneously rotate along a second direction, and the portion of the flexible display screen in which the camera hole is defined is wound around the one of the pivot shafts.

4. The display device according to claim 1, wherein the two side edges of the flexible display screen are connected to two pivot shafts respectively in glue connection or snap-fit connection.

5. The display device according to claim 1, wherein the camera device is fixed on one of the sub-frame bodies.

6. The display device according to claim 1, wherein a distance between the central axes of the two pivot shafts when the telescopic mechanism is retracted is less than the distance between the central axes of the two pivot shafts when the telescopic mechanism is stretched.

7. The display device according to claim 1, wherein
   when the telescopic mechanism is in a stationary state, the camera device is turned on, the two pivot shafts simultaneously rotate along a first direction, the camera hole and the lens are disposed oppositely; and
   when the telescopic mechanism is in the stationary state, the camera device is turned off, the two pivot shafts simultaneously rotate along a second direction, and the portion of the flexible display screen in which the camera hole is defined is wound around one of the pivot shafts.

8. The display device according to claim 1, wherein
   when the telescopic mechanism is retracted, the camera device is turned off, one of the pivot shafts rotates along a second direction, the other of the pivot shafts rotates around a first direction, the portion of the flexible display screen in which the camera hole is defined is wound around one of the pivot shafts; or, one of the pivot shafts rotates along the second direction, the other of the pivot shafts does not rotate, and the portion of the flexible display screen in which the camera hole is defined is wound around one of the pivot shafts; and
   when the telescopic mechanism is stretched, the camera device is turned on, one of the pivot shafts rotates along the first direction, the other of the pivot shafts rotates along the second direction, the camera hole and the lens are disposed oppositely; or one of the pivot shafts rotates along the first direction, the other of the pivot shafts does not rotate, and the camera hole and the lens are disposed oppositely.

* * * * *